United States Patent [19]
Eddinger et al.

[11] Patent Number: 6,074,464
[45] Date of Patent: Jun. 13, 2000

[54] PHOSPHATE BONDED ALUMINUM COATINGS

[75] Inventors: Kevin B. Eddinger, Gilbertsville; Mark F. Mosser, Perkiomenville; John E. Hughes, West Chester; Ronald E. Myers, Pottstown, all of Pa.

[73] Assignee: Sermatech International, Inc., Limerick, Pa.

[21] Appl. No.: 09/017,775

[22] Filed: Feb. 3, 1998

[51] Int. Cl.[7] .............................. C23F 11/00; C23C 22/05
[52] U.S. Cl. .................................. 106/14.12; 106/14.44; 148/259; 148/261; 148/262
[58] Field of Search ............................. 106/14.12, 14.44; 148/259, 261, 262

[56] References Cited

U.S. PATENT DOCUMENTS

| | | | |
|---|---|---|---|
| 3,248,251 | 4/1966 | Allen | 106/14.12 |
| 3,395,027 | 7/1968 | Klotz | 106/14.12 |
| 4,537,632 | 8/1985 | Mosser | 106/14.21 |
| 4,755,224 | 7/1988 | Bibber | 106/14.21 |
| 4,863,516 | 9/1989 | Mosser | 106/14.12 |
| 4,878,963 | 11/1989 | Bibber | 106/14.12 |
| 4,895,608 | 1/1990 | Bibber | 148/261 |
| 4,988,396 | 1/1991 | Bibber | 148/269 |
| 5,242,488 | 9/1993 | Stetson | 106/14.12 |
| 5,279,649 | 1/1994 | Stetson | 106/14.12 |
| 5,279,650 | 1/1994 | Stetson | 106/14.12 |
| 5,478,413 | 12/1995 | Mosser | 148/261 |
| 5,554,231 | 9/1996 | Bibber | 106/14.21 |
| 5,652,064 | 7/1997 | Mosser et al. | 428/472.3 |
| 5,803,990 | 9/1998 | Mosser et al. | 148/261 |

FOREIGN PATENT DOCUMENTS

| | | |
|---|---|---|
| 676486 | 3/1995 | European Pat. Off. . |
| 668496 | 3/1952 | United Kingdom . |
| 97/02369 | 1/1997 | WIPO . |

OTHER PUBLICATIONS

Chemical Abstract No. 131:47657, abstract of German Patent Specification No. 19756735 (Jun. 1999).

Database WPI Section Ch, Week 9805 Derwent Publications Ltd., London, GB; Class M11, AN 98–05061 XP002103387 –& RU 2 082 839 C (Khimprom Stock Co), Jun. 27, 1997 * abstract *.

Database WPI Section Ch, Week 7946 Derwent Publications Ltd., London, GB; Class G02, AN 79–83537B XP002103388 –& JP 54 130615 A (Nippon Steel Corp), Oct. 11, 1979 *abstract *.

Hawke, David et al., "A Phosphate–Bermanganat Conversion Coating for Magnesium", *Metal Finishing*, Oct. 1995, pp. 34–38.

*Primary Examiner*—Anthony Green
*Attorney, Agent, or Firm*—Seidel, Gonda, Lavorgna & Monaco, PC

[57] ABSTRACT

A bonding composition for a heat curable overlay coating for coating a substrate is provided. The bonding composition comprises phosphate ions, permanganate ions, at least one species of metal cation having a valence greater than +1, and water. The bonding composition has a pH in the range from about 1.5 to about 4.5 and is substantially free of chromate ions and molybdate ions. Preferably, the molar ratio of phosphate ions to permanganate ions in the bonding composition is in the range from about 2:1 to about 580:1 and the nonvolatile content of the bonding composition is in the range from about 10% (wt) to about 35% (wt). Aluminum ions are a preferred species of metal cation in the bonding composition. Overlay coating compositions are also provided containing metallic aluminum particles dispersed in the bonding composition of the invention.

13 Claims, No Drawings

PHOSPHATE BONDED ALUMINUM COATINGS

FIELD OF THE INVENTION

The present invention relates generally to the field of corrosion protection for metal substrates, and more specifically, to bonding solutions and coating compositions free, or substantially free, of carcinogenic or toxic metals.

BACKGROUND OF THE INVENTION

Compositions comprising phosphoric acid and aluminum metal are well known for use in protecting metallic surfaces such as ferrous alloy surfaces from corrosion. In such coating compositions, particulate metallic aluminum such as flake and/or powdered aluminum is combined with a phosphoric acid bonding solution to form a coating composition which is then applied to the metallic surface being treated. After application to the surface, the coating composition may be heated to a first temperature, generally at least about 500° F. (260° C.), until the coating is rendered essentially water insoluble. The coated surface may then be cured at a second temperature, generally above 1000° F. (538° C.) to form the final protective coating.

The cured coating prepared from the combination of particulate metallic aluminum and phosphoric acid bonding solution is termed an "undercoat" or "basecoat". It is often further desirable to provide an extra protective barrier to the metal surface that may provide thermal resistance or simply augment the corrosion protection afforded by the coating formed from the coating composition described above. An extra protective layer applied to the cured undercoat is termed a "topcoat". The topcoat may be formed from a bonding solution similar to that used in the undercoat, but containing little or no particulate metal. The basecoat or topcoat composition may further contain a pigment which imparts visually aesthetic qualities to the coating. The pigment(s) may also be functional and improve certain properties of the coating such as corrosion resistance, erosion life, and bond strength.

Care must be taken in the preparation of phosphate-based coating compositions containing particulate aluminum metal. The phosphoric acid bonding solution can react with the aluminum. Such reactions are considerably exothermic and can be very violent, causing the metallic aluminum to burn or even explode. These reactions may also result in the conversion of the metallic aluminum into various salts which interfere with the formation of suitable protective coatings. Thus, the reactive stability of a coating composition in the presence of metallic aluminum is of foremost concern.

U.S. Pat. No. 3,248,251, to Allen, describes coating compositions consisting essentially of a slurry of solid inorganic particulate material (such as metallic aluminum) in an aqueous acidic bonding solution containing dissolved metal chromate, dichromate or molybdate, and phosphate. Allen discloses that the addition of chromates or molybdates to the acidic bonding solution effectively passivated the solution toward aluminum and inhibited the oxidation of metallic aluminum, allowing particulate aluminum to be combined with the bonding solution without the undesirable chemical reaction between the acidic bonding solution and the aluminum. These "Allen" coatings have been, and still are, used to provide high-quality coatings which protect ferrous metal alloy surfaces from oxidation and corrosion, particularly at high temperatures. It is also known that the inclusion of chromate ion or molybdate ion in the coating composition provides a coating having improved corrosion resistance.

However, while chromates and molybdates have been used successfully to reduce the reactivity of the aluminum in coating compositions and to improve the corrosion resistance of the coatings, the use of chromates and molybdates has become a problem because of environmental considerations. Chromates are considered carcinogenic. Molybdenum is classified as a toxic heavy metal. It is therefore desirable to avoid the use of solutions of their salts, or at least to reduce their use. For this reason, it has been desirable to develop a phosphate/aluminum corrosion resistant coating composition which requires little or no chromate or molybdate to control the reactivity between the acidic phosphate bonding solution and the particulate aluminum added thereto. Such coating compositions should protect ferrous metal alloy surfaces from oxidation and corrosive environmental conditions, especially at high temperatures, approximately as well as and preferably better than the so-called Allen coatings (i.e., per U.S. Pat. No. 3,248,251).

Efforts have been made to exclude chromate and molybdate from coating compositions while maintaining stable formulations. U.S. Pat. No. 5,242,488 to Stetson et al., describes a basecoat coating composition for ferrous alloys which does not require either chromates or molybdates to control the reaction between the bonding solution and the powdered aluminum. The composition consists essentially of a slurry mixture of a bonding solution and aluminum powder. The bonding solution consists essentially of water, phosphoric acid ($H_3PO_4$), and aluminum ions. The bonding solution must contain aluminum ions in solution such that the amount of aluminum in solution is substantially at the saturation point, thus leaving the bonding solution essentially inert with respect to any subsequent additions of aluminum.

U.S. Pat. No. 5,279,649, also to Stetson, et al., discloses substantially the same compositions, but to which $V_2O_5$ has been added as a source of vanadate ion, adding another inhibitor to the aluminum equilibrated mixture. Addition of $V_2O_5$ is an example of the addition of a toxic substance, listed on the OSHA extremely hazardous substance list and also subject to Clean Air Act and CERCLA regulation.

Further, in U.S. Pat. No. 5,279,650, also to Stetson, et al., a seal coating (topcoat) composition containing vanadate ion and iron oxide ($Fe_2O_3$) powder is disclosed.

All three of these Stetson coating compositions are designed to avoid the use of chromate and molybdate ions and require the bonding solution to be equilibrated with respect to further additions of aluminum as described in these patents.

Although the Stetson patents indicate that these formulations control the reactivity between the bonding solution and the aluminum, some reaction still occurs between the bonding solution and the powdered aluminum when the slurry compositions of the Stetson patents are formulated.

U.S. Pat. No. 5,478,413 to Mosser et al. is directed to coating compositions lacking chromate or molybdate. These coating compositions are pigmented with metallic aluminum powder and can be applied to all ferrous alloys. These coatings may require a topcoat to be applied thereon for satisfactory protection of the metal substrate in some applications.

U.S. Pat. No. 3,395,027 to Klotz is directed to a corrosion resistant basecoat composition containing phosphate, nitrate, chromate, magnesium ions, and a particulate metal. The coatings of Klotz are primarily directed towards protection of a magnesium surface.

Permanganate ion has been used in chemical conversion coatings applied to aluminum and magnesium surfaces. See for example, U.S. Pat. No. 4,895,608 to Bibber. A conversion coating is a composition that reacts with the surface of the substrate to form a reaction product that serves as the coating thereon. In contrast to a conversion coating is an "overlay" coating, so named because the composition does not react with the substrate surface to generate the coating matrix. An overlay coating may have a sacrificial function, whereas conversion coatings do not. Conversion coatings are generally much thinner than overlay coatings and are not employed in the high stress applications that demand the more durable overlay coatings.

None of the patents described above disclose non-conversion coatings which provide a satisfactory protective coating composition comprising a chromate- and molybdate-free formulation employing permanganate ion to reduce the reactivity of the bonding composition to metallic aluminum or reduce the reactivity of a topcoat to an aluminum-containing basecoat or ferrous alloy surface.

It is therefore desired to formulate a chromate- and molybdate-free bonding composition, or one which is of reduced chromate and molybdate content, which not only has a reduced reactivity with particulate aluminum when the two are combined to form an overlay coating composition, but also enables the formulation of an effective coating while being free of toxic additives.

SUMMARY OF THE INVENTION

A bonding composition for a heat curable overlay coating for coating a substrate is provided. The bonding composition comprises phosphate ions, permanganate ions, at least one species of metal cation having a valence greater than +1, and water. The bonding composition has a pH in the range from about 1.5 to about 4.5 and is substantially free of chromate ions and molybdate ions. Preferably, the molar ratio of phosphate ions to permanganate ions in the bonding composition is in the range from about 2:1 to about 580:1 and the nonvolatile content of the bonding composition is in the range from about 10% (wt) to about 35% (wt). Aluminum ions are a preferred species of metal cation in the bonding composition.

The bonding composition of the present invention may serve as an overlay topcoat composition. A topcoat overlay composition may also comprise the bonding composition having an additive combined therewith, selected from the group consisting of wetting agents, film-forming agents, corrosion inhibitors, dry lubricants, chromatic pigments, and combinations thereof.

An overlay coating composition is also provided, comprising metallic aluminum particles dispersed in a bonding composition of the present invention. The bonding composition comprises phosphate ions, permanganate ions, at least one species of metal cation having a valence greater than +1, and water; the bonding composition has a pH in the range from about 1.5 to about 4.5 and is substantially free of chromate ions and molybdate ions. The metallic aluminum particles may be selected from the group consisting of flake particles, inert gas atomized spherical particles, air atomized powders, and mixtures thereof. The metallic aluminum particles preferably have an average equivalent spherical diameter less than 5 $\mu$m. The overlay coating composition may further comprise an additive selected from the group consisting of corrosion inhibitors, dry lubricants, surface active agents, chromatic pigments, refractory metal oxides, and combinations thereof.

A coated article is also provided, comprising a solid substrate having deposited thereon at least one layer of an overlay coating. The overlay coating is formed by applying an overlay coating composition comprising phosphate ions, permanganate ions, at least one species of metal cation having a valence greater than +1, and water. The bonding composition has a pH in the range from about 1.5 to about 4.5 and is substantially free of chromate ions and molybdate ions. The applied coating composition is then cured to produce the overlay coating. A coated article comprising a solid substrate having deposited thereon at least one layer of an overlay coating composition is also provided, the overlay coating composition further comprising metallic aluminum particles dispersed in the coating composition. The applied coating composition is then cured to produce the overlay coating.

A method of forming an overlay coating on a solid substrate is also provided, comprising the steps of applying an overlay coating composition comprising phosphate ions, permanganate ions, at least one species of metal cation having a valence greater than +1, and water. The bonding composition has a pH in the range from about 1.5 to about 4.5 and is substantially free of chromate ions and molybdate ions. The overlay coating composition may further comprise metallic aluminum particles dispersed in the coating composition.

DETAILED DESCRIPTION OF THE INVENTION

The bonding composition of the present invention comprises an aqueous solution containing phosphate ion ($PO_4^{-3}$) and permanganate ion ($MnO_4^-$). The bonding composition may be conveniently referred to as a phosphate/permanganate system. The bonding composition further contains in solution at least one species of metal cation having a valence greater than +1.

Metal ions that may be employed include aluminum ions, magnesium ions, iron ions, cerium ions, cobalt ions, nickel ions, manganese ions, copper ions, and zinc ions. Other cation species may be employed, limited only by the ability of the resulting bonding composition to be unreactive with respect to metallic aluminum particles and the development of a stable, corrosion resistant coating. Preferably, the metal cations comprise aluminum ions. Cobalt ions, nickel ions, and chromium (III) ions, though toxic to some extent, are far less toxic than chromate and molybdate ions and therefore can be used in the composition, particularly in the prescribed concentrations. The bonding composition of the present invention may contain a pigment or surface active agent for basecoat or modified topcoat applications.

A bonding composition of the present invention comprises an aqueous solution containing phosphoric acid, one or more sources of permanganate ions, and at least one source of metal ion having a valence greater than +1. A preferred embodiment of a bonding composition of the present invention comprises an aqueous solution of phosphoric acid, one or more sources of permanganate ions, and one or more sources of aluminum ions dissolved in the phosphoric acid solution. Yet another preferred embodiment of a bonding composition of the present invention comprises an aqueous phosphoric acid solution containing, in addition to a source of permanganate ions, a source of aluminum ions and at least one additional species of metal cations having a valence greater than +1.

The bonding composition of the present invention, and the overlay coatings of the invention formulated therefrom, are substantially free of regulated toxic chromate or molybdate. "Substantially free", as used herein, is understood to mean completely free of said constituent, or inclusive of trace amounts of same. "Trace amounts" are those quantitative levels of a chemical constituent that are barely detectable and provide no benefit to the functional or aesthetic properties of the subject composition. As used herein, the term "chromate" refers to chromate ion, dichromate ion, and any other form of hexavalent chromium. Molybdate ions may be added in small amounts, subject to regulatory limitations, because toxicity of the molybdate is lower than chromate and it is not carcinogenic, per current understanding.

An overlay protective coating composition may be formulated in accordance with the present invention by dispersing particulate metallic aluminum in the bonding composition, thus forming a basecoat composition. The bonding composition of the present invention may also be utilized in formulating a topcoat protective coating (or "sealer"). The bonding composition of the present invention can be applied to a surface and cured to form an overlay topcoat coating, or the bonding composition may have added thereto modifying additives for enhanced performance in topcoat coating applications. When the bonding composition is utilized to prepare a topcoat, the composition may be applied in any fashion that an overlay coating composition is applied and it may be applied directly to a basecoat on a substrate or directly to a substrate. It is understood that application of a topcoat composition to a solid substrate includes the case where a basecoat is first formed on the substrate.

The bonding composition has a pH in the range of 1.5 to 4.5.

If aluminum ions are present in the bonding composition, they are present in an amount below the saturation point, thus in a quantity insufficient to substantially equilibrate the bonding solution with respect to metal particles like aluminum which are added in formulating an overlay coating composition. The concentration of aluminum ions dissolved in the bonding solution of the present invention is an amount less than that which permits the formation of an aluminium-containing precipitate or aluminum-containing salts. The existence of otherwise unreacted or precipitated aluminum or aluminum-containing salts indicates that the reaction between the aluminium ions in the solution with the phosphoric acid has gone to completion and equilibrium thus reached. As noted above, however, when aluminum ions are present in the bonding composition of the present invention, it is in an amount insufficient to neutralize the bonding composition with respect to aluminum particles.

The bonding composition of the present invention is stable, that is, unreactive or substantially unreactive, or even inert, to particulate metallic aluminum subsequently added to form an overlay coating composition. An overlay coating composition of the present invention will not exhibit visible signs of reaction when particulate aluminum is dispersed in the bonding solution for at least up to one hour, preferably for up to four hours, more preferably up to eight hours and ideally for more than eight hours.

Permanganate ions may be introduced to the bonding composition in the form of Group I permanganate salts (such as those containing potassium, sodium, or lithium), zinc permanganate, calcium permanganate or ammonium permanganate. Any convenient source of permanganate ions which will dissolve in phosphoric acid, forming metallic cations and permanganate ions, is a suitable source of permanganate ions. Other ions can be introduced to the bonding composition to adjust the solution's pH. It is generally convenient to add magnesium oxide and/or magnesium carbonate as a source of magnesium ions to also adjust the pH of the composition. The amount of metal-containing compounds added alone or in combination with other compounds should be sufficient to bring the pH within the desired range of 1.5 to 4.5. Compounds introduced to the solution to modify the pH comprise sources of metal cations having a valence greater than +1.

While magnesium ions, aluminum ions, and zinc ions are most useful for pH control, such as their use for increasing the pH of the bonding composition, other divalent and trivalent cations can be used. These cations are usually introduced to the solution as metal oxides, metal-containing hydrated oxides, metal carbonates or metal phosphates. A preferred source of aluminum ions, for example, is aluminum hydroxide.

The presence of permanganate ions in these compositions eliminates the need for chromate ion or dichromate ion to be added to stabilize the coating mixture when aluminum powders are added. Permanganate compounds, though strong oxidizers like chromate, are not carcinogenic.

The bonding compositions (and coating compositions prepared therefrom) of the present invention preferably have a molar ratio of phosphate ions to permanganate ions in the range from about 2:1 to about 580:1, most preferably in the range from about 8:1 to about 20:1.

The bonding compositions of the present invention have an upper limit of about 40% (wt) nonvolatile content. The nonvolatile content of the solution is the quantity of inorganic material that remains in a bonding solution heated to 220 °F. (105° C.) for 60 minutes as described in ASTM D2369. At levels greater than 40% (wt), it is difficult to dissolve enough pH-adjusting material. Additionally, higher nonvolatile component levels promote higher slurry viscosities upon addition of metallic aluminum particles or other pigments and additives, in turn negatively affecting the sprayability of the coating composition. Conversely, nonvolatile content levels that are too low do not permit formation of a useful coating. Most notably, coatings prepared from a bonding composition deficient in nonvolatile content are likely to exhibit impaired flexibility evidenced by failed bend adhesion tests. Therefore, the preferred bonding solutions of the present invention have a nonvolatile content of about 10% (wt) to about 35% (wt).

In accordance with the present invention, an overlay coating composition, particularly used as a basecoat composition, is formed by mixing the above-described bonding composition with particulate metal to form a slurry. Preferably, aluminum in the form of a powder is the particulate metal. The bonding composition is essentially inert with respect to any further reaction with the added aluminum and does not react therewith.

The bonding compositions of the present invention are particularly useful for forming coating compositions for ferrous metal alloy substrates when combined with particulate aluminum. The particulate metallic aluminum may be pure aluminum or alloys of aluminum; as understood herein, metallic aluminum is inclusive of pure aluminum and alloys of aluminum. Sources of particulate aluminum suitable for use in such coating compositions are well known, and have been discussed at length in the patent literature. For example, U.S. Pat. No. 4,863,516 to Mosser is particularly directed to the use of non-leafing aluminium flake in combination with atomized aluminum particles.

Metallic aluminum particles used in the preparation of the coating compositions of the invention may take the form of inert gas-atomized spherical aluminum particles having an average diameter from about 2.0 to about 10 μm equivalent spherical diameters (ESD); air-atomized aluminum particles having an average diameter of about 1.5 to about 10 μm ESD; flake aluminum particles; or mixtures thereof. Particles larger than 10 μm ESD, or particles smaller than 2 μm ESD, may be used. Most preferably, the particles have an equivalent spherical diameter less than 5 μm. Aluminum powders are examples of suitable aluminum particles. Aluminum powders suitable for use in the practice of the present invention are commercially available from Eckart America and Valimet, Inc.

The overlay coating compositions of the present invention may also include one or more leachable corrosion inhibitors. A leachable corrosion inhibitor is one which is capable of inhibiting or passivating the corrosion of the metal substrate. The leachable corrosion inhibitor is preferably a salt containing environmentally acceptable metals such as metal phosphates, metal metaborates, and combinations thereof, as well as other corrosion inhibitors listed in a publication by Smith entitled "Inorganic Primer Pigments", Federation Series on Coatings Technology and incorporated herein by reference. Suitable leachable corrosion inhibitors for use in the coating compositions of the present invention are zinc phosphate and barium, calcium, zinc borate and zinc aluminum phosphate.

The coating compositions of the invention may, of course, contain other ingredients for coatings such as film-forming agents, wetting agents, or other surfactants (collectively, "surface active agents"), chromatic pigments, and other conventional additives. Other additives include, for example, refractory metal compounds such as silica, zirconia, alumina, silicon carbide, aluminum silicate, and metal powders that may be added for higher heat resistance. Dry lubricants, such as graphite or tungsten disulfide, may also be added to the coating compositions.

The preferred mole ratios of phosphate ions to permanganate ion are unchanged in those systems in which a pigment is added.

A surfactant solution may be added to the coating compositions of the present invention, particularly in topcoat applications, to promote sprayability and film-forming properties. For example, if a surfactant is utilized, a volumetric equivalent of 10% of the bonding composition is added containing a surfactant solution. The surfactant may be any commercially-available ionic or non-ionic surfactant. A preferred surfactant is Triton X-100 from Union Carbide.

The preparation of the bonding compositions and overlay coating compositions of the present invention follow conventional methods well known in the art. The components of the bonding compositions and coating compositions are added and mixed at room temperature under low-shear mixing conditions.

The overlay coating compositions of the invention containing metallic aluminum are applied to ferrous metal alloy surfaces following conventional application methods. Generally, it is desirable to degrease the part to be coated and to abrade, roughen and blast the surface with abrasive. The coating composition of the invention is then applied by any suitable means. Suitable application means include spraying, brushing, dipping, dip spinning, and the like. The applied coating is then dried until the color of the coating appears "grayish". The coating composition is then cured at about 650° F. (343° C.) for 15 minutes or longer, at higher or lower temperatures if desired, to form a coating. The coating composition is preferably applied in two coats, each about 0.001 inch (25 μm) in thickness. It may be desired to dry and cure the coating between applied coating steps. Though drying is not essential, a typical dry/cure scheme employs 15 to 30 minutes of exposure to a temperature of 180° F. (82° C.), followed by curing at 650° F. (343° C.) for 30 to 60 minutes.

The coatings cured at 650° F. (343° C.) are not electrically conductive and therefore can not provide galvanic protection against corrosion of the underlying substrate material. However, the coating may be made electrically conductive by bead peening or burnishing with glass beads, abrasive media at low pressure or mechanically cold worked in other ways to procure a conductive sacrificial coating, or by heating as specified in MIL-C-81751B specification (incorporated herein by reference). In this matter the coatings can, by mechanical or thermal processes, be made electrically conductive and thereby produce galvanic as well as barrier protection of the underlying ferrous alloy substrate. Desirably, after the second coating is applied, dried, cured and processed to make it electrically conductive, the surface of the coating is sealed with the bonding composition to further increase the oxidation and corrosion protection provided by the coating, and to decrease the rate of consumption of aluminum in the coating during service. The bonding composition can be, but need not be, a bonding composition of the invention. The topcoats, or seal coats, are dried and cured at the same time and temperature as the above described overlay coatings containing metallic aluminum.

It is contemplated that all metallic substrates are candidates for receiving protective coatings of the present invention. The overlay coating compositions of the present invention can be applied to any ferrous metal alloy article including cast iron, mild steel, low alloy steels, 300 series stainless steels, nickel-based alloys and titanium alloys. The coating compositions are designed particularly for turbine compressors. Turbine compressors are usually manufactured from 400 series stainless steel having 12% chromium. The coating compositions can be applied to blades, disks, spacers, vanes, hubs, cases, and other steel components. While ferrous alloy substrates are the preferred metal substrate for coated articles of manufacture, it is believed that any solid substrate is, in fact, a suitable candidate for the coatings of the present invention, limited only by the ability of the solid substrate to survive the curing process.

The practice of the invention is illustrated by the non-limiting examples that follow. In the following examples, and unless otherwise specified, coating compositions are spray-applied to metal substrates. All curing processes follow the procedure: drying at 175° F. for 15 minutes, then curing for 30 minutes at 650° F. Where specified, average particle sizes for aluminum powders are measured using the Fisher Sub Sieve Sizer ("FSSS", ASTM B330). The average particle diameter determined by the FSSS is actually a statistical average rather than a true particle size. Unless designated otherwise, the aluminum powder utilized in the coating compositions of the Examples is Eckart 1-201 aluminum powder from Eckart America, Inc.

Several of the formulated coatings in the following examples were evaluated for the completeness of cure. As conducted for the examples herein, a hot water resistance test required application of the overlay (or basecoat) coating compositions to a steel panel that is then cured as set forth above to form a coating. The coated panel was then placed in hot deionized water for 10 minutes. The deionized water was heated to boiling prior to the introduction of the coated panel. The concentration of leached phosphate ion in the water bath was measured with a Hach PO-19 test kit.

Coatings with poor hot water resistance (a phosphate concentration greater than about 30 mg/L) exhibited a reduced corrosion resistance, as evidenced by formation of concentrated corrosion cells. These coatings are unacceptable as protective overlay coatings or as topcoat sealer coatings. Coatings with desirable hot water resistance (phosphate concentration less than 10 mg/L) were more completely cured, and resultingly, exhibited a more uniform corrosion resistance behavior evidenced by a reduced amount of corrosion product. Coatings yielding a leached phosphate concentration between 10 mg/L and 30 mg/L are less desirable than those passing the test as coating compositions. Coatings that are less completely cured are basecoats that are not compatible with many film-forming topcoats because the material that leaches from the coating disrupts the topcoat film.

Several of the formulated coatings in the following examples were subjected to a bend adhesion test. The bend adhesion test is a measure of a coating's adhesion to a substrate and the flexibility of the coating. As conducted for the examples below (where noted), a metal substrate panel coated with the subject coating was bent 90 degrees around a mandrel equal to 14 times the thickness of the test panel. Test results were measured qualitatively, with a failure noted when the coating cracked or chipped from the substrate panel more than ⅛ inch from the specimen's edge.

In addition to the bend adhesion and hot water resistance tests, several other tests were conducted to assess the performance of applied coating compositions of the present invention. Table I summarizes the tests and the passing criteria.

TABLE I

Performance Tests

| Test Description | Requirement |
|---|---|
| 500 hrs. salt spray per ASTM B117 (scribed with an "X") | no evidence of attack of the base metal |
| Bend adhesion, 90° around a 0.25 inch mandrel | no cracking or separation from the base metal greater than ⅛ inch from edge |
| Hot Water Resistance (insolubility) | <10 mg/L $PO_4$ in water after immersion of coated specimen for 10 min. in hot DI water. $PO_4$ test using HACH PO19 test kit |
| Abrasion Resistance, Falling sand per ASTM D968 | >100 L/mil |
| Oxidation Resistance, 100 hrs at 1000° F. | <1 mg/cm$^2$ weight change |
| Hydraulic Fluid Resistance, 24 hrs in Skydrol at 300° F. | no blistering or softening of coating |

Preferred embodiments of the present invention are illustrated in Examples 1 and 4.

EXAMPLE 1

A bonding composition was prepared by combining the following ingredients:

| 1000 g | Deionized water |
| 25 g | Potassium permanganate |
| 338 g | 85% Phosphoric acid |
| 117 g | Aluminum hydroxide, dried gel |

A low-viscosity solution having a nonvolatile content of 20%(wt) was obtained. The pH of the solution was 1.8. The molar ratio of phosphate ion to permanganate ion in the solution was calculated at 18.5.

A coating composition was prepared by adding metallic aluminum to the bonding composition according to the following:

| 100 ml | Bonding composition |
| 60 g | Aluminum metal powder, air atomized 4.5 μm avg. particle size |

No visible signs of reaction between the bonding composition and the aluminum powder were observed during the 8 hour period following the introduction of the powder to the solution. Signs of reaction include visible bubbling, volume expansion, heat generation, change in viscosity and, ultimately, solidification. A slight reaction was observed after 16 hours.

In a comparative example, a coating composition prepared in accordance with U.S. Pat. No. 5,242,488 to Stetson showed visible signs of reaction in less than one hour. The comparative formulation was prepared in accordance with claim 3 of the Stetson patent, using 2300 g water, 1018 g 85% phosphoric acid, 354 g magnesium carbonate, and 75 g aluminum hydroxide, and having 2,998 g aluminum powder added thereto. Useful formulations for a coating composition should have a stability of at least one hour, and preferably longer.

The coating composition of the present invention, prepared as described above, was spray-applied to mild steel test panels, dried at 175° F. for 15 minutes, and then cured at 650° F. for 30 minutes. A continuous, smooth and hard coating was obtained. The coating passed the bend adhesion test.

A representative steel panel was tested, via the hot water resistance test, to assess the completeness of the cure. The coated panel was placed in a beaker of deionized water (heated to boiling immediately prior to the introduction of the steel panel) for 10 minutes. The quantity of soluble phosphate in the water was determined (at 10 minutes) using a calorimetric test method (Hach PO-19 test kit). The presence of leached phosphate in the water is a gauge of the extent of the curing process. The measured phosphate concentration was 9 mg/L. A comparative example was prepared with a prior art coating set forth in U.S. Pat. No. 5,478,413 to Mosser (Example 2 therein), yielding a phosphate concentration of 32.3 mg/L. Thus, the coating prepared from a coating composition of the present invention is more desirable as a corrosion-resistant basecoat composition because a more complete cure permits increased compatibility with a topcoat sealer and increased corrosion resistance.

A coating prepared from the coating composition of Example 1 passed all tests listed in Table I.

EXAMPLE 2

A bonding composition was prepared by mixing the following:

| 1000 g | Deionized water |
| 100 g | Potassium permanganate |

-continued

| | |
|---|---|
| 170 g | 85% Phosphoric acid |
| 56 g | Aluminum hydroxide, dried gel |

The pH of the solution was 1.9. The molar ratio of phosphate ion to permanganate ion was calculated at 2.3.

A coating composition of the present invention was prepared as set forth in Example 1, employing the bonding composition of Example 2:

| | |
|---|---|
| 100 ml | Bonding composition |
| 60 g | Aluminum metal powder, air atomized, 4.5 µm avg. particle size |

No reaction was observed between the metallic aluminum and the bonding composition after 24 hours.

Coated steel panels were tested for leaching phosphate ion, as described in Example 1. A concentration of phosphate ion in the deionized water less than 5 mg/L was measured. The coating prepared from the coating composition passed all tests listed in Table I.

EXAMPLE 3

A bonding composition was prepared by mixing the following:

| | |
|---|---|
| 1000 g | Deionized water |
| 2.0 g | Potassium permanganate |
| 850 g | 85% Phosphoric acid |
| 56 g | Aluminum hydroxide, dried gel |

The bonding composition had a pH of 1.9 and a molar ratio of phosphate ion to permanganate ion calculated at 580.

A coating composition was prepared by mixing the following:

| | |
|---|---|
| 100 ml | Bonding composition (Example 3) |
| 60 g | Aluminum powder |

No evidence of reaction between the aluminum powder and the bonding composition was observed at 4 hours following the introduction of the powder to the solution. A continuous, hard coating was achieved when the coating composition was spray-applied to an aluminum test panel and cured at 650° F.

EXAMPLE 4

A bonding composition was prepared by mixing the following:

| | |
|---|---|
| 1000 g | Deionized water |
| 40 g | Potassium permanganate |
| 253 g | 85% Phosphoric acid |
| 80 g | Magnesium carbonate |
| 20 g | Aluminum nitrate, nonahydrate |

The solution had a pH of 2.4 and a molar ratio of phosphate ion to permanganate ion calculated at 8.7.

A coating composition was prepared by mixing the following:

| | |
|---|---|
| 100 ml | Bonding composition (Example 4) |
| 75 g | Air atomized aluminum powder |

No evidence of reaction between the aluminum powder and the bonding composition was observed at 4 hours following the introduction of the powder to the solution.

The coating composition was applied to mild steel test panels, dried, and cured at 650° F. for 30 minutes to form a coating.

A 5% salt-spray corrosion test was conducted per ASTM B117 on the test panels, as well as on identical steel panels coated with prior art coating compositions. The prior art coatings were prepared from U.S. Pat. No. 3,248,251 to Allen (Example 7 therein) and U.S. Pat. No. 5,478,413 to Mosser (Example 2 therein). The panels coated with the coating composition of the present invention exhibited less corrosion (via visual comparison) than the panels having coatings of the prior art. Thus, the coating of the present invention enables corrosion resistance at least as good as, and better than, coatings of the prior art.

The coating prepared from the coating composition of Example 4 passed all tests listed in Table I.

EXAMPLE 5

A topcoat composition was prepared by mixing the following:

| | |
|---|---|
| 100 ml | Bonding composition of Example 4 |
| 2 g | 2-methyl-1,3-propanediol |

The substituted propanediol is a surfactant promoting film formation. This topcoat composition was applied to a steel airfoil coated with the basecoat composition set forth in Example 4. In addition, comparative examples were prepared by applying coatings of the prior art (as set forth in Example 4) to similar steel airfoils. Each steel airfoil additionally received a cured topcoat coating prepared from the respective basecoat compositions, exclusive of dispersed metallic aluminum. The steel airfoils were subjected to 500 hours of salt spray testing per ASTM B117. The coating prepared from the coating composition of the present invention permitted no corrosion of the steel substrate and, compared to the airfoils having prior art coatings, a reduced amount of sacrificial corrosion products was observed.

EXAMPLE 6

A bonding composition was prepared by mixing the following:

| | |
|---|---|
| 1000 g | Deionized water |
| 25 g | Sodium permanganate, monohydrate |
| 338 g | 85% Phosphoric acid |
| 117 g | Aluminum hydroxide, dried gel |

The pH of the resulting solution was 1.8. The molar ratio of phosphate ion to permanganate ion was calculated at 18.8.

A coating composition containing 100 ml of the bonding composition of Example 6 and 60 g aluminum powder (air atomized, 4.5 μm avg. particle size) was prepared. The resulting slurry remained stable for over 8 hours following the introduction of the aluminum powder to the bonding composition. A coating prepared from the coating composition passed the bend adhesion test.

EXAMPLE 7

A bonding composition was prepared by mixing the following:

| | |
|---|---|
| 1000 g | Deionized water |
| 25 g | Potassium permanganate |
| 338 g | 85% Phosphoric acid |
| 50 g | Aluminum hydroxide, dried gel |
| 50 g | Zinc carbonate |

The pH of the resulting solution was 1.8 and the molar ratio of phosphate ion to permanganate ion was calculated at 18.5.

A coating composition was prepared by adding aluminum powder to the bonding solution as follows:

| | |
|---|---|
| 100 ml | Bonding solution |
| 60 g | Aluminum powder (inert gas atomized spherical; avg. particle size of 2.7 μm) |

The aluminum powder employed herein is commercially available as Valimet H-3 (Valimet, Inc.). Mild steel panels were coated with the coating composition. The adhesive bonding strength of the coating to the steel substrate was tested by bending the panel 90 degrees around a 0.25 inch mandrel. The coating was not observed to flake or crack along the bend. Thus, the presence of multiple cation species included for pH adjustment purposes has no effect on the integrity of the coating.

EXAMPLE 8

A bonding composition was prepared by mixing the following:

| | |
|---|---|
| 1000 g | Deionized water |
| 10 g | Potassium permanganate |
| 170 g | 85% Phosphoric acid |
| 65 g | 5:1 mixture (wt) magnesium carbonate and aluminum hydroxide |

The pH of this composition was 3.4 and the molar ratio of phosphate ion to permanganate ion was calculated at 23.4.

A coating composition was prepared as set forth in Example 1 from 100 ml of bonding composition of Example 8. No reaction between the bonding composition and the aluminum powder was observed during the 48 hour period following the introduction of the powder to the solution. The coating passed the bend adhesion test.

EXAMPLE 9

A commercially available conversion coating (SAFEGARD 7000 Part A from Sanchem, Inc.) designed for use on aluminum and aluminum alloys was assessed for its reactivity with metallic aluminum powder. This conversion coating is an alkaline potassium permanganate solution, but is not recommended to be used with aluminum metal powder. This alkaline conversion coating had a pH of 9.15. To 5 ml of the conversion coating was added while stirring 3 g aluminum powder (finely divided; avg. particle size 4.5 μm). Within 3 minutes of mixing, a violent and highly exothermic reaction occurred.

This test result indicates the lack of stability of an alkaline permanganate solution with aluminum powder. Such result is in contrast to the many hours of stability exhibited by the acidic, permanganate-containing formulations of the present invention.

It is further understood that the present invention is not limited to the particular embodiments shown and described herein, but that various changes and modifications may be made without departing from the scope and spirit of the invention.

What is claimed is:

1. A heat curable bonding composition for a heat curable overlay coating for coating a substrate, the bonding composition comprising:
   (a) phosphate ions and permanganate ions;
   (b) at least one species of metal cation having a valence greater than +1; and
   (c) water;
   wherein the composition has a pH in the range from about 1.5 to about 4.5 and is substantially free of chromate ions and molybdate ions, said bonding composition having a nonvolatile content of not more than about 35% by weight.

2. A bonding composition as in claim 1, wherein the phosphate ions and permanganate ions are in a molar ratio in the range from about 2:1 to about 580:1.

3. A bonding composition as in claim 2, wherein the molar ratio of phosphate ions to permanganate ions is in the range from about 8:1 to about 20:1.

4. A bonding composition as in claim 1, wherein the metal cations are aluminum ions.

5. A heat curable overlay topcoat composition comprising:
   (a) phosphate ions and permanganate ions;
   (b) at least one species of metal cation having a valence greater than +1;
   (c) water; and
   (d) an additive selected from the group consisting of wetting agents, film-forming agents, corrosion inhibitors, dry lubricants, chromatic pigments, and combinations thereof;
   wherein the composition has a pH in the range from about 1.5 to about 4.5 and is substantially free of chromate ions and molybdate ions, said topcoat composition having a nonvolatile content of not more than about 35% by weight.

6. A heat curable composition comprising metallic aluminum particles dispersed in a bonding composition comprising:
   (a) phosphate ions and permanganate ions;
   (b) at least one species of metal cation having a valence greater than +1; and
   (c) water;
   wherein the composition has a pH in the range from about 1.5 to about 4.5 and is substantially free of chromate ions and molybdate ions.

7. An overlay coating composition as in claim 6, wherein the phosphate ions and permanganate ions are in a molar ratio in the range from about 2:1 to about 580:1.

8. An overlay coating composition as in claim 7, wherein the molar ratio of phosphate ions to permanganate ions is in the range from about 8:1 to about 20:1.

9. An overlay coating composition as in claim 6, wherein the bonding composition has a nonvolatile content in the range from about 10% (wt) to about 35% (wt).

10. An overlay coating composition as in claim 6, wherein the metal cations of the bonding composition are aluminum ions.

11. An overlay coating composition as in claim 6, wherein the metallic aluminum particles are selected from the group consisting of flake particles, inert gas atomized spherical powders, air atomized powders, and mixtures thereof.

12. An overlay coating composition as in claim 6, wherein the metallic aluminum particles have an average equivalent spherical diameter less than 5 $\mu$m.

13. An overlay coating composition as in claim 6, further comprising an additive selected from the group consisting of corrosion inhibitors, dry lubricants, surface active agents, chromatic pigments, refractory metal oxides, and combinations thereof.

* * * * *